United States Patent
Griesdorf et al.

(10) Patent No.: US 10,004,076 B1
(45) Date of Patent: Jun. 19, 2018

(54) SELECTING WIRELESS COMMUNICATION CHANNELS BASED ON SIGNAL QUALITY METRICS

(71) Applicant: Cognitive Systems Corp., Waterloo (CA)

(72) Inventors: Dustin Griesdorf, Waterloo (CA); Stephen Arnold Devison, Kitchener (CA); Mohammad Omer, Waterloo (CA); Yunfeng Piao, Kitchener (CA); Oleksiy Kravets, Petersburg (CA); Tajinder Manku, Waterloo (CA); Christopher Vytautas Olekas, Breslau (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days. days.

(21) Appl. No.: 15/706,193

(22) Filed: Sep. 15, 2017

Related U.S. Application Data

(60) Provisional application No. 62/472,375, filed on Mar. 16, 2017.

(51) Int. Cl.
  *G01S 1/02* (2010.01)
  *G01S 3/02* (2006.01)
  (Continued)

(52) U.S. Cl.
  CPC ........... *H04W 72/0453* (2013.01); *G01S 1/02* (2013.01); *G01S 3/02* (2013.01); *H04B 17/309* (2015.01); *H04W 64/00* (2013.01); *G01P 13/00* (2013.01)

(58) Field of Classification Search
  CPC ....... H04W 64/00; H04W 64/006; G01S 1/02; G01S 3/02
  See application file for complete search history.

(56) References Cited

U.S. PATENT DOCUMENTS

| 4,054,879 A | 10/1977 | Wright et al. |
| 4,075,573 A | 2/1978 | Kennedy et al. |

(Continued)

FOREIGN PATENT DOCUMENTS

| CA | 2834522 | 5/2014 |
| CA | 2945702 | 8/2015 |

(Continued)

OTHER PUBLICATIONS

USPTO; Restriction Requirement dated Jan. 23, 2018, in U.S. Appl. No. 15/706,295.

(Continued)

*Primary Examiner* — Christopher Crutchfield
(74) *Attorney, Agent, or Firm* — Henry Patent Law Firm PLLC

(57) ABSTRACT

In a general aspect, a wireless communication channel is selected based on signal quality metrics. In some aspects, a first wireless communication device receives a first set of signals based on wireless signals transmitted through a space on a first wireless communication channel from a second wireless communication device. A signal quality metric value is computed based on the first set of signals, and a second wireless communication channel is selected based on a determination that the value of the signal quality metric does not meet a quality criterion for a motion detection process. The first wireless communication device receives a second set of signals based on wireless signals transmitted through the space on the second wireless communication channel from the second wireless communication device, and the motion detection process is executed to detect motion of an object in the space based on the second set of signals.

30 Claims, 6 Drawing Sheets

(51) Int. Cl.
*G01P 13/00* (2006.01)
*H04W 64/00* (2009.01)
*H04W 72/04* (2009.01)
*H04B 17/309* (2015.01)

(56) References Cited

U.S. PATENT DOCUMENTS

| | | | |
|---|---|---|---|
| 4,193,055 | A | 3/1980 | Barnum |
| 4,225,858 | A | 9/1980 | Cole et al. |
| 4,286,260 | A | 8/1981 | Gershberg et al. |
| 4,649,388 | A | 3/1987 | Atlas |
| 4,740,045 | A | 4/1988 | Goodson et al. |
| 4,870,663 | A | 9/1989 | Kulju et al. |
| 5,270,720 | A | 12/1993 | Stove |
| 5,519,400 | A | 5/1996 | McEwan |
| 5,696,514 | A | 12/1997 | Nathanson et al. |
| 6,075,797 | A | 6/2000 | Thomas |
| 6,493,380 | B1 | 12/2002 | Wu et al. |
| 6,573,861 | B1 | 6/2003 | Hommel et al. |
| 7,047,015 | B2 | 5/2006 | Hawe |
| 7,295,109 | B2 | 11/2007 | Kobayashi |
| 7,317,419 | B2 | 1/2008 | Sugar et al. |
| 7,652,617 | B2 | 1/2010 | Kurtz et al. |
| 7,916,066 | B1 | 3/2011 | Osterweil |
| 8,138,918 | B2 | 3/2012 | Habib |
| 8,331,498 | B2 | 12/2012 | Huang et al. |
| 8,477,750 | B2 | 7/2013 | Agarwal et al. |
| 8,710,984 | B2 | 4/2014 | Wilson et al. |
| 8,818,288 | B2 | 8/2014 | Patwari et al. |
| 8,836,344 | B2 | 9/2014 | Habib et al. |
| 9,030,321 | B2 | 5/2015 | Breed |
| 9,143,413 | B1 | 9/2015 | Manku et al. |
| 9,143,968 | B1 | 9/2015 | Manku et al. |
| 9,523,760 | B1 | 12/2016 | Kravets et al. |
| 9,524,628 | B1 | 12/2016 | Omer et al. |
| 9,551,784 | B2 | 1/2017 | Katuri |
| 9,584,974 | B1 | 2/2017 | Omer et al. |
| 9,743,294 | B1 | 8/2017 | Omer et al. |
| 2001/0046870 | A1* | 11/2001 | Stilp ............... G01S 5/02 455/456.2 |
| 2003/0007473 | A1 | 1/2003 | Strong et al. |
| 2003/0108119 | A1 | 6/2003 | Mohebbi et al. |
| 2005/0055568 | A1 | 3/2005 | Agrawala et al. |
| 2005/0083199 | A1 | 4/2005 | Hall et al. |
| 2006/0217132 | A1 | 9/2006 | Drummond-Murray et al. |
| 2007/0293232 | A1 | 12/2007 | Nonaka |
| 2008/0119130 | A1 | 5/2008 | Sinha |
| 2008/0240008 | A1 | 10/2008 | Backes et al. |
| 2008/0303655 | A1 | 12/2008 | Johnson |
| 2009/0040952 | A1 | 2/2009 | Cover et al. |
| 2009/0062696 | A1 | 3/2009 | Nathan et al. |
| 2009/0079615 | A1 | 3/2009 | Wu et al. |
| 2009/0128302 | A1 | 5/2009 | Srinivasan et al. |
| 2009/0128360 | A1 | 5/2009 | Bianchi et al. |
| 2010/0013636 | A1 | 1/2010 | Wu |
| 2010/0026490 | A1 | 2/2010 | Butler et al. |
| 2010/0103020 | A1 | 4/2010 | Wu |
| 2010/0315284 | A1 | 12/2010 | Trinza et al. |
| 2011/0130092 | A1 | 6/2011 | Yun et al. |
| 2011/0148689 | A1 | 6/2011 | Filippi et al. |
| 2012/0009882 | A1 | 1/2012 | Patwari et al. |
| 2012/0011365 | A1* | 1/2012 | Schmidt ............ G01D 21/00 713/168 |
| 2012/0115512 | A1 | 5/2012 | Grainger et al. |
| 2012/0146788 | A1 | 6/2012 | Wilson et al. |
| 2012/0184296 | A1 | 7/2012 | Milosiu |
| 2012/0212366 | A1 | 8/2012 | Alalusi |
| 2013/0005280 | A1 | 1/2013 | Leung et al. |
| 2013/0090151 | A1 | 4/2013 | Ngai et al. |
| 2013/0162459 | A1 | 6/2013 | Aharony et al. |
| 2013/0283256 | A1 | 10/2013 | Proud |
| 2014/0004874 | A1 | 1/2014 | Schwartz et al. |
| 2014/0015706 | A1 | 1/2014 | Ishihara et al. |
| 2014/0128778 | A1 | 5/2014 | Chan et al. |
| 2014/0135042 | A1 | 5/2014 | Buchheim et al. |
| 2014/0140231 | A1 | 5/2014 | Haiut et al. |
| 2014/0247179 | A1 | 9/2014 | Furuskog |
| 2014/0285324 | A1* | 9/2014 | Austin ............... G01S 13/84 340/10.3 |
| 2014/0286380 | A1 | 9/2014 | Prager et al. |
| 2014/0301260 | A1 | 10/2014 | Park et al. |
| 2015/0043377 | A1 | 2/2015 | Cholas et al. |
| 2015/0063323 | A1 | 3/2015 | Sadek et al. |
| 2015/0078295 | A1 | 3/2015 | Mandyam et al. |
| 2015/0098377 | A1 | 4/2015 | Amini et al. |
| 2015/0189528 | A1 | 7/2015 | Carbajal |
| 2015/0195100 | A1 | 7/2015 | Imes et al. |
| 2015/0212205 | A1 | 7/2015 | Shpater |
| 2015/0245164 | A1 | 8/2015 | Merrill |
| 2015/0292879 | A1 | 10/2015 | Zhou et al. |
| 2015/0338507 | A1 | 11/2015 | Oh et al. |
| 2016/0018508 | A1 | 1/2016 | Chen et al. |
| 2016/0183059 | A1 | 6/2016 | Nagy et al. |
| 2016/0187475 | A1 | 6/2016 | Horng et al. |
| 2016/0210838 | A1 | 7/2016 | Yan et al. |
| 2016/0241999 | A1 | 8/2016 | Chin et al. |
| 2017/0146656 | A1 | 5/2017 | Belsley et al. |
| 2017/0195893 | A1* | 7/2017 | Lee ............... H04W 16/28 |
| 2017/0309146 | A1 | 10/2017 | MacKenzie et al. |
| 2017/0343658 | A1 | 11/2017 | Ramirez et al. |

FOREIGN PATENT DOCUMENTS

| | | |
|---|---|---|
| WO | 2014/021574 | 2/2014 |
| WO | 2014201574 | 12/2014 |
| WO | 2015/168700 | 11/2015 |

OTHER PUBLICATIONS

USPTO, Notice of Allowance dated Jan. 10, 2018, in U.S. Appl. No. 15/803,189, 28 pgs.

USPTO; Non-Final Office Action dated Jan. 23, 2018, in U.S. Appl. No. 15/789,815, 35 pgs.

Wei, et al., "Radio-based Device-free Activity Recognition with Radio Frequency Interference", IPSN '15 Proceedings of the 14th International Conference on Information Processing in Sensor Networks, Apr. 13-16, 2015, 12 pgs.

Zheng, et al., "Detecting Radio Frequency Interference for CSI Measurements on COTS WiFi Devices", IEEE ICC 2017, Ad-Hoc and Sensor Networking Symposium, May 2017, 6 pgs.

Canadian Intellectual Property Office, International Search Report and Written Opinion for International Application No. PCT/CA2017/050037 dated Apr. 13, 2017, 12 pages.

USPTO, Notice of Allowance issued in U.S. Appl. No. 15/461,125 dated Aug. 30, 2017, 15 pages.

Canadian Intellectual Property Office, International Search Report and Written Opinion issued International Application No. PCT/CA2016/051228 dated Apr. 25, 2017, 8 pages.

Canadian Intellectual Property Office, International Search Report and Written Opinion issued in International Application No. PCT/CA2016/051466 dated Mar. 14, 2017, 9 pages.

Apple Insider; "Intel to reportedly supply LTD chips for 2016 iPhone"; http://appleinsider.com/articles/15/03/11/intel-to-reportedly-supply-ltd-chips-for-2016-iphone; 2 pages; May 15, 2016.

CEVA; "CEVA's DSP Cores Power the World's Leading Mobile Broadband and M2M Applications"; http://www.ceva-dsp.com/Mobile-Broadband; 3 pages; May 15, 2016.

Japan Radio Co., Ltd; "26GHz FWA—Technology"; http://www.jrc.co.jp/eng/product/lneup/26ghz_wireless_ip_access_system/tech.html; 3 pages; May 15, 2016.

USPTO, Non-Final Office Action received in U.S. Appl. No. 15/099,833, dated Jun. 27, 2016, 16 pages.

USPTO, Non-Final Office Action received in U.S. Appl. No. 15/151,571, dated Aug. 5, 2016, 18 pages.

USPTO, Notice of Allowance received in U.S. Appl. No. 15/099,833, dated Oct. 14, 2016, 8 pages.

USPTO, Notice of Allowance received in U.S. Appl. No. 15/151,571, dated Jan. 10, 2017, 9 pages.

(56) References Cited

OTHER PUBLICATIONS

USPTO, Notice of Allowance received in U.S. Appl. No. 15/228,418, dated Oct. 12, 2016, 9 pages.
quora.com; "What is the function of the baseband processor in wireless devices?"; https://ww.quora.com/What-is-the-function-of-the-baesband-processor-in-wireless-devices; 2 pages; May 15, 2016.
Wikipedia; "Baseband processor"; rhttps://en.wikipedia.org/wiki/Bandband_processor; 2 pages; version dated Apr. 20, 2016.
Canadian Intellectual Property Office, "International Search Report and Written Opinion", in International Application No. PCT/CA2016/051229, dated Jan. 17, 2017, 9 pages.
Netgear , "N600 Wifi Cable Modem Router, Model C3700 User Manual", https://web.archive.org/web/20150121182848/http://www.downloads.netgearcom/files/GDC/C3700_UM_21Aug2014.pdf (archive of URL http://www.downloads.netgear.com/files/GDC/C3700_UM_21Aug2014.pdf captured on Jan. 21, 2015, 101 pages.
Openwrt, "Wireless Configuration", https://web.archive.org/web/20140402033233/http://wiki.openwrt.org/doc/uci/wireless (capture of URL http://wiki.openwrt.org/doc/uci/wireless on Apr. 2, 2014), 22 pages.
USPTO, Final Office Action received in U.S. Appl. No. 15/176,489 dated Jun. 23, 2017, 23 pages.
USPTO, Notice of Allowance issued in U.S. Appl. No. 15/460,643 dated Jun. 12, 2017, 34 pages.
USPTO, Non-final Office Action issued in U.S. Appl. No. 15/461,125 dated Apr. 19, 2017, 56 pages.
USPTO, "Non-final Office Action", issued in U.S. Appl. No. 15/176,489 dated Mar. 22, 2017, 41 pages.
USPTO, Non-Final Office Action dated Dec. 28, 2017, in U.S. Appl. No. 15/789,761, 31 pgs.
USPTO, Non-Final Office Action received in U.S. Appl. No. 15/799,768 dated Dec. 13, 2017, 7 pgs.
Youssef, Moustafa , et al., "Challenges: Device-free Passive Localization for Wireless Environments", Mobicom 07 Proceedings of the 13th Annual ACM International Conference on Mobile Computing and Networking, Sep. 2007, 31 pgs.
USPTO, Notice of Allowance dated Jan. 29, 2018, in U.S. Appl. No. 15/461,125, 16 pgs.
USPTO, Notice of Allowance dated Feb. 13, 2018, in U.S. Appl. No. 15/683,637, 25 pgs.
USPTO, Non-Final Office Action dated Feb. 7, 2018, in U.S. Appl. No. 15/176,489, 30 pgs.
USPTO, Non-Final Office Action dated Jan. 26, 2018, in U.S. Appl. No. 15/815,199, 36 pgs.
CIPO, International Search Report and Written Opinion dated Jan. 26, 2018, in PCT/CA2017/051290, 9 pgs.
USPTO, Non-Final Office Action issued in U.S. Appl. No. 15/691,195 dated Nov. 15, 2017; 17 pgs.
CIPO, International Search Report and Written Opinion dated Feb. 9, 2018, in PCT/CA2017/051276, 9 pgs.

* cited by examiner

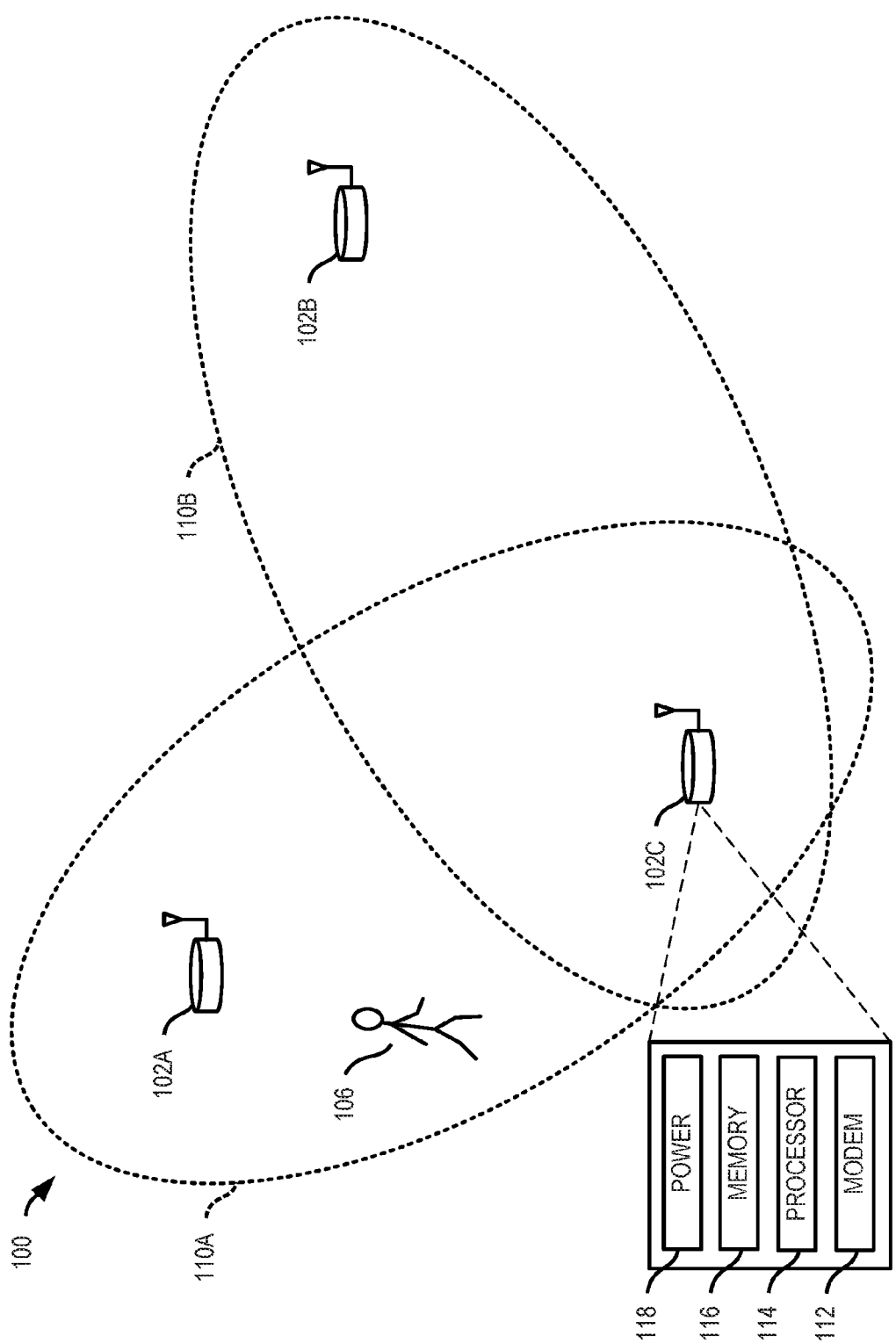

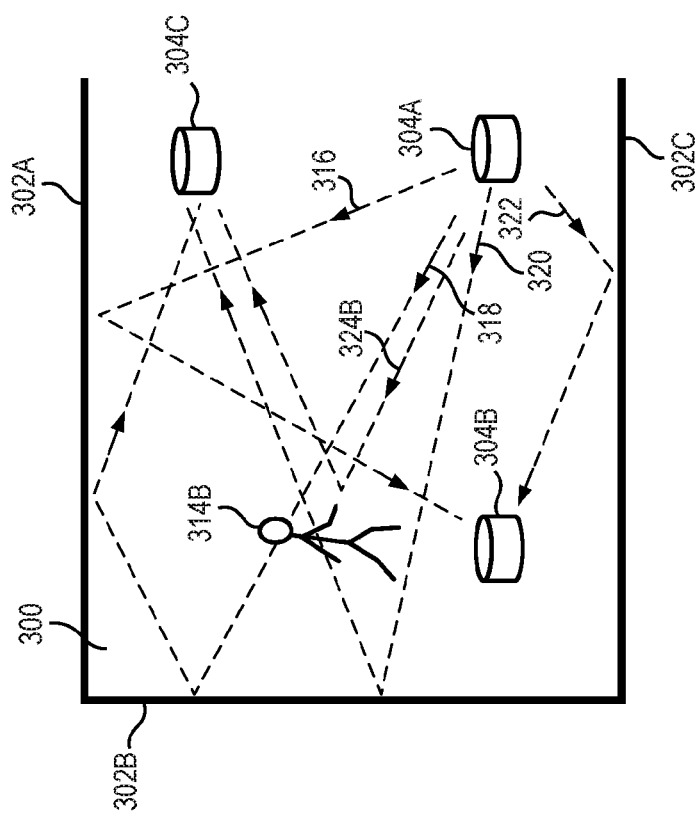
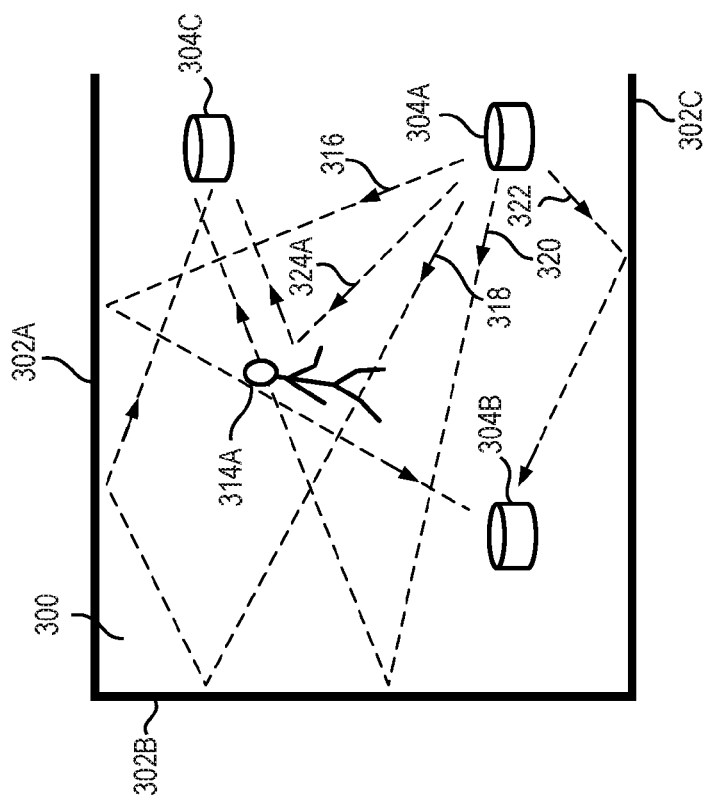
Fig. 3A
Fig. 3B

SELECTING WIRELESS COMMUNICATION CHANNELS BASED ON SIGNAL QUALITY METRICS

CROSS-REFERENCE TO RELATED APPLICATIONS

This application claim priority to U.S. Provisional Application No. 62/472,375, filed Mar. 16, 2017 and entitled "Selecting Wireless Communication Channels for Motion Detection Signals Using Quality Metrics," which is hereby incorporated by reference.

BACKGROUND

The following description relates to motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIG. 1A is a diagram showing an example wireless communication system.

FIGS. 3A and 3B are diagrams showing example wireless signals communicated between wireless communication devices.

DETAILED DESCRIPTION

Figure 1B:
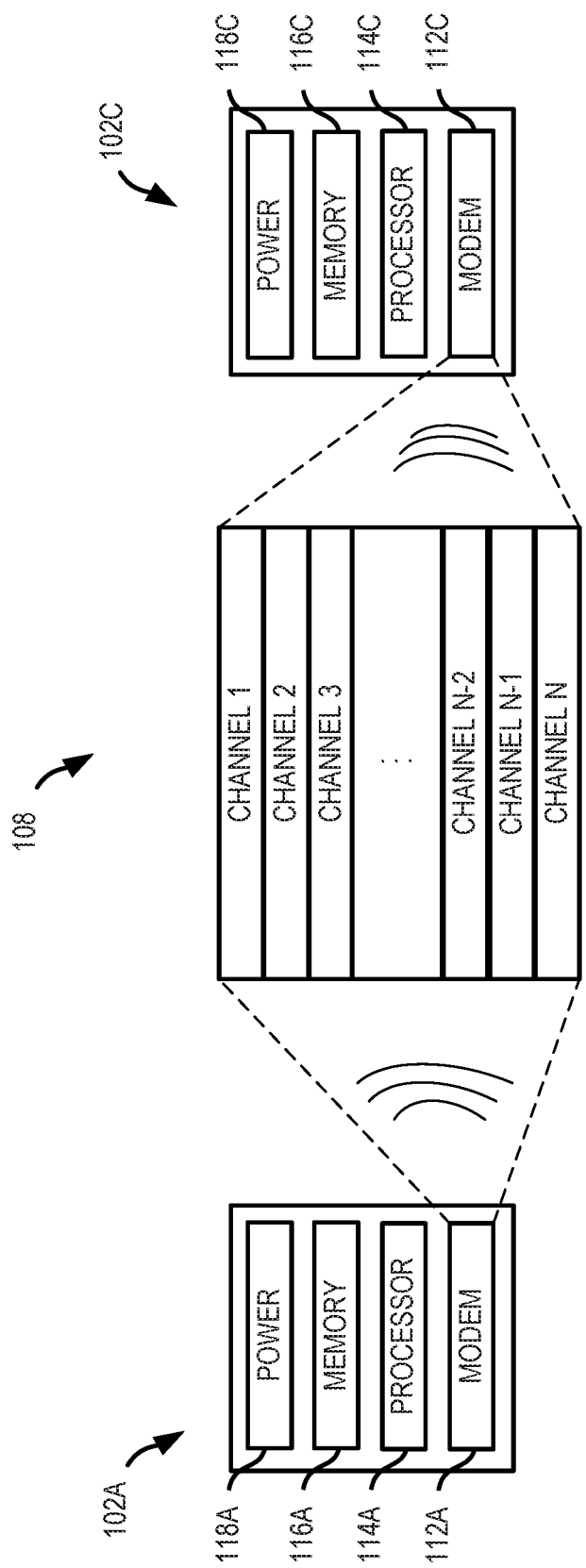
FIG. 1B is a diagram showing example wireless network devices communicating on wireless communication channels.

In some aspects of what is described, wireless communication channels are selected based on signal quality metrics. For instance, in some cases, a signal quality metric is computed based on motion detection signals received by a wireless communication device on a wireless communication channel (e.g., a frequency channel or a coded channel). The signal quality metric estimates a quality of the communication between respective wireless communication devices on the wireless communication channel. The signal quality metric may be based on a channel response for the space traversed by the wireless signals, a signal-to-noise ratio for signals received by a wireless communication device, a number of packets that are accepted or rejected as inputs to a motion detection process, another type of quality metric, or a combination thereof. In some instances, the signal quality metric is based on a period of time over which a minimum number of signals are accepted as inputs for the motion detection process. In some instances, the signal quality metric is based on a number of communication paths between a transmitting wireless communication device and a receiving wireless communication device (e.g., between a particular pair of transmitting and receiving antennas). In some instances, weighting may be applied to factors considered in determining the signal quality metric.

In some implementations, a wireless communications device (or another device coupled to the wireless communications device, e.g., a server that is remote from the devices) may select, based on a signal quality metric, a wireless communication channel on which the wireless communication devices communicate. For example, a receiving wireless communication device can determine whether a computed signal quality metric is above or below a pre-determined threshold (which may be a quality criterion for the motion detection process). If the signal quality metric is not above the threshold, then a new wireless communication channel is selected for communication. In some instances, the receiving wireless communication device can send a message indicating the new wireless communication channel. For example, the receiving wireless communication device can instruct the transmitting wireless communication device to "move" to a different wireless communication channel that has been selected by the receiving wireless communication device, and to transmit motion detection signals on the selected channel. In some instances, the process is repeated for the selected channel. For instance, a signal quality metric may be determined for motion detection signals received on the selected channel, and if the signal quality metric is below the threshold, then another channel is selected. If the signal quality metric for the new channel is above the threshold, then the devices may proceed with communication on the channel. In some instances, the wireless communication devices can periodically check signal quality metrics for other channels to ensure they are communicating on the highest quality wireless communication channel.

In some implementations, the wireless communication devices determine a best wireless communication channel for communication based on signals transmitted on multiple wireless communication channels. A signal quality metric can be computed for each channel, and one of the channels may be selected based on as comparison of the signal quality metrics for the multiple channels. For example, it can be determined whether a signal quality metric for one of the wireless communication channels is better than a signal quality metric for a wireless communication channel currently being used. If a channel is found with a higher signal quality metric, the channel is selected and the wireless communication devices begin communicating on that channel. Otherwise, the wireless communication devices may continue communicating on the current wireless communication channel. In some instances, the wireless communication devices can periodically perform the process to ensure they are communicating on the highest quality wireless communication channel.

In some implementations, to reduce or avoid issues in detecting motion, the wireless communication devices may pause the channel selection process when motion is currently being detected. The channel selection process may continue once motion is no longer being detected. In some implementations, averages of computed signal quality metrics may be used in the channel selection process to "smooth" the behavior of the signal quality metric, since interference may come and go sporadically.

In some implementations, the wireless communication devices may each have multiple transmitting or receiving antennas, and thus, may communicate over multiple communication paths between those antennas. The antennas of each wireless communication device may constitute one of multiple signal hardware paths, and each communication path may accordingly be defined by a signal hardware path from the transmitting wireless communication device and a signal hardware path from the receiving wireless communication device. For instance, a transmitting wireless communication device may have two transmitting antennas (e.g., T1 and T2) and a receiving wireless communication device may have two receiving antennas (e.g., R1 and R2). The wireless communication devices may accordingly communicate over up to four communication paths (e.g., T1→R1, T1→R2, T2→R1, and T2→R2). A signal quality metric may be determined for each communication path used by the wireless communication devices. In the example where each device has two transmitting antennas and two receiving antennas, up to four signal quality metrics may be determined for motion detection signals communicated between the wireless communication devices, and the channel selection process may include selecting a communication path based on the computed signal quality metrics for the respective communication paths.

In some implementations, a number of viable communication paths between wireless communication devices is determined, and the wireless communication channel is selected based on the number of viable communication paths on the channels. For example, the wireless communication channel with the largest number of viable communication paths may be chosen for communication. In some implementations, wireless communication channel may be selected based on both the number of viable communication paths and the value of the signal quality metric. For example, a wireless communication channel may be chosen based on having the highest signal quality metric among channels with a minimum number of viable communication paths. In systems with multiple wireless communication devices (e.g., three or more wireless communication devices), a different channel may be selected for each wireless communication link based on the number of viable communication paths or the channel score values. For example, one link between a pair of wireless communication devices may operate on a first wireless communication channel and another link between a different pair of wireless communication devices may operate on a second wireless communication channel.

The systems and techniques described here may provide one or more advantages in some instances. For example, motion may be detected using wireless signals transmitted through a space. The motion may be detected more efficiently by selecting a wireless communication channel that has the best signal quality metric. Furthermore, links between pairs of wireless communication devices can operate on different channels.

FIG. 1A is a diagram showing an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices and other components (e.g., additional wireless communication devices, one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In some cases, the wireless communication devices 102A, 102B, 102C can be, or they may include, standard wireless network components; for example, a conventional Wi-Fi access point or another type of wireless access point (WAP) may be used in some cases. In some cases, another type of standard or conventional Wi-Fi transmitter device may be used. The wireless communication devices 102A, 102B, 102C may be implemented without Wi-Fi components; for example, other types of standard or non-standard wireless communication may be used for motion detection. In some cases, the wireless communication devices 102A, 102B, 102C can be, or they may be part of, a dedicated motion detection system.

As shown in FIG. 1A, the example wireless communication device 102C includes a modem 112, a processor 114, a memory 116, and a power unit 118; any of the wireless communication devices 102A, 102B, 102C in the wireless communication system 100 may include the same, additional or different components, and the components may be configured to operate as shown in FIG. 1A or in another manner. In some implementations, the modem 112, processor 114, memory 116, and power unit 118 of a wireless communication device are housed together in a common housing or other assembly. In some implementations, one or more of the components of a wireless communication device can be housed separately, for example, in a separate housing or other assembly.

The example modem 112 can communicate (receive, transmit, or both) wireless signals. For example, the modem 112 may be configured to communicate radio frequency (RF) signals formatted according to a wireless communication standard (e.g., Wi-Fi). The modem 112 may be implemented as the example wireless network modems 112A, 112B shown in FIG. 1C, or may be implemented in another manner, for example, with other types of components or subsystems. In some implementations, the example modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the modem 112 can include one or more antennas and radio frequency circuitry.

The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. Referring to the example shown in FIG. 1C, the radio subsystem may include the radio chip 113, the RF front end 115, and antennas 117, 119. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some cases, the radio subsystem includes multiple signal hardware paths (e.g., multiple antennas). In some implementations, the modem 112 (or any of its components, including, for example, the radio chip 113, the RF front end 115, and antennas 117, 119 of FIG. 1C) can be implemented using commercial products or components, for example, a commercial Wi-Fi modem, a commercial cellular modem, a commercial Bluetooth modem, or commercially-available components thereof.

In some cases, a baseband subsystem in the modem 112 can include, for example, digital electronics configured to process digital baseband data. As an example, the baseband subsystem may include the baseband chip 111 shown in FIG. 1C. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 112 receives baseband signals from the baseband subsystem, up-converts the baseband signals to radio frequency (RF) signals, and wirelessly transmits the radio frequency signals (e.g., through an antenna). In some instances, the radio subsystem in the example modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example modem 112 can communicate wireless network traffic (e.g., data packets) in the wireless communication network through the radio subsystem on one or more network traffic channels. The baseband subsystem of the modem 112 may also transmit or receive (or both) signals (e.g., motion probe signals or motion detection signals) through the radio subsystem on a dedicated wireless communication channel. In some instances, the baseband subsystem generates motion probe signals for transmission, for example, in order to probe a space for motion. In some instances, the baseband subsystem processes received motion detection signals (signals based on motion probe signals transmitted through the space), for example, to detect motion of an object in a space. For instance, the baseband subsystem of the modem 112 may be programmed (e.g., by software) to perform one or more operations (e.g., computing a signal quality metric, etc.) in the example processes 400, 500 of FIGS. 4, 5.

The example processor 114 can execute instructions, for example, to generate output data based on data inputs. The instructions can include programs, codes, scripts, or other types of data stored in memory. Additionally or alternatively, the instructions can be encoded as pre-programmed or re-programmable logic circuits, logic gates, or other types of hardware or firmware components. The processor 114 may be or include a general purpose microprocessor, as a specialized co-processor or another type of data processing apparatus. In some cases, the processor 114 performs high level operation of the wireless communication device 102C. For example, the processor 114 may be configured to execute or interpret software, scripts, programs, functions, executables, or other instructions stored in the memory 116. In some implementations, the processor 114 may be included in the modem 112. In some implementations, the processor 114 executes instructions that implement the processes 400, 500 of FIGS. 4, 5.

The example memory 116 can include computer-readable media, for example, a volatile memory device, a non-volatile memory device, or both. The memory 116 can include one or more read-only memory devices, random-access memory devices, buffer memory devices, or a combination of these and other types of memory devices. In some instances, one or more components of the memory can be integrated or otherwise associated with another component of the wireless communication device 102C. The memory 116 may store instructions that are executable by the processor 114. The instructions may include instructions for selecting a wireless communication channel for communication based on signal quality metrics, such as by using the processes 400, 500 of FIGS. 4, 5.

The example power unit 118 provides power to the other components of the wireless communication device 102C. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., an AC adapter) that receives an external power signal (from an external source) and coverts the external power signal to an internal power signal conditioned for a component of the wireless communication device 102C. The power unit 118 may include other components or operate in another manner.

In the example shown in FIG. 1A, the wireless communication devices 102A, 102B transmit wireless signals (e.g., according to a wireless network standard, a motion detection protocol, or otherwise). For instance, wireless communication devices 102A, 102B may broadcast wireless signals (e.g., reference signals, beacon signals, status signals, etc.), or they may send wireless signals addressed to other devices (e.g., a user equipment, a client device, a server, etc.), and the other devices (not shown) as well as the wireless communication device 102C may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In the example shown, the wireless communication device 102C, operating in a state defined by modem parameters, processes the wireless signals from the wireless communication devices 102A, 102B and detects motion of an object in a space accessed by the wireless signals. For example, the wireless communication device 102C may perform the example processes 400, 500 of FIGS. 4, 5, or another type of process for detecting motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the wireless communication device 102C can transmit wireless signals and the wireless communication devices 102A, 102B can processes the wireless signals from the wireless communication device 102C to detect motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, the third wireless communication device 102C may generate motion detection data. In some instances, the third wireless communication device 102C may communicate the motion detection data to another device or system, such as a security system, that may include a control center for monitoring movement within a space, such as a room, building, outdoor area, etc.

Figure 2:
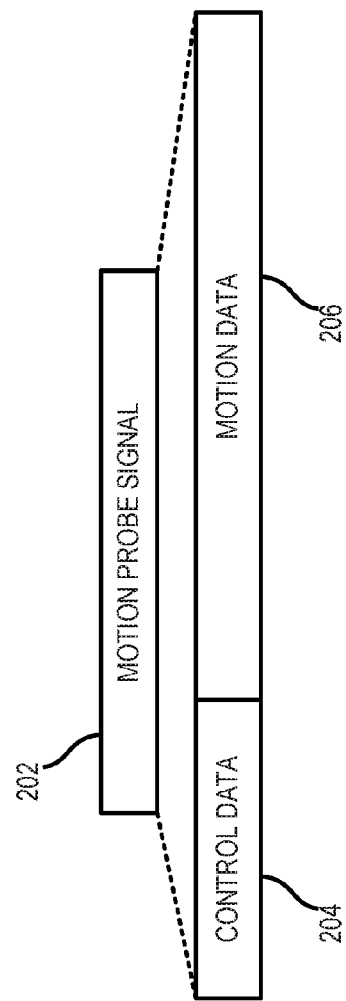
FIG. 2 is a diagram showing an example motion probe signal.

In some implementations, the wireless communication devices 102A, 102B can be modified to transmit motion probe signals (e.g., those described below with respect to FIG. 2) on a separate wireless communication channel (e.g., a frequency channel or coded channel) from wireless network traffic signals. For example, the modulation applied to the payload of a motion probe signal and the type of data or data structure in the payload may be known by the third wireless communication device 102C, which may reduce the amount of processing that the third wireless communication device 102C performs for motion sensing. The header may include additional information such as, for example, an indication of whether motion was detected by another device in the communication system 100, an indication of the modulation type, an identification of the device transmitting the signal, etc.

In the example shown in FIG. 1A, the wireless communication link between the third wireless communication device 102C and the first wireless communication device 102A can be used to probe a first motion detection field 110A, and the wireless communication link between the third wireless communication device 102C and the second wireless communication device 102A can be used to probe a second motion detection field 110B. In some instances, the third wireless communication device 102C detects motion in the motion detection fields 110A, 110B by processing received signals that are based on wireless signals transmitted by the wireless communication devices 102A, 102B, respectively. For example, when the person 106 shown in FIG. 1A moves in the first motion detection field 110A, the third wireless communication device 102C may detect the motion based on signals received at the third wireless communication device 102C that are based on wireless signals transmitted by the first wireless communication device 102A.

In some instances, the motion detection fields 110A, 110B can include, for example, air, solid materials, liquids, or another medium through which wireless electromagnetic signals may propagate. In the example shown in FIG. 1A, the first motion detection field 110A provides a wireless communication channel between the first wireless communication device 102A and the third wireless communication device 102C, and the second motion detection field 110B provides a wireless communication channel between the second wireless communication device 102B and the third wireless communication device 102C. In some aspects of operation, wireless signals transmitted on a wireless communication channel (separate from or shared with the wireless communication channel for network traffic) are used to detect movement of an object in a space. The objects can be any type of static or moveable object, and can be living or inanimate. For example, the object can be a human (e.g., the person 106 shown in FIG. 1A), an animal, an inorganic object, or another device, apparatus, or assembly, an object that defines all or part of the boundary of a space (e.g., a wall, door, window, etc.), or another type of object.

FIG. 1B is a diagram showing the example wireless communication devices 102A, 102C communicating on wireless communication channels 108. The wireless communication channels 108 may be used to transfer data between the wireless communication devices 102A, 102C. In the example shown, the wireless communication device 102A transmits wireless signals on one or more of the wireless communication channels 108, and the wireless signals are received by the wireless communication device 102C. The wireless communication channels 108 may be defined by a wireless communication standard or other wireless communication protocol. In the example shown in FIG. 1A, the wireless communication devices 102A, 102C support communication on N distinct wireless communication channels 108. In some implementations, the wireless communication channels include N-X distinct network traffic channels for carrying network traffic (e.g., data packets) transferred between the wireless communication devices 102A, 102C, and X distinct motion detection channels for carrying motion detection signals (e.g., motion probe signals formatted like the motion probe signal 202 of FIG. 2) between the wireless communication devices 102A, 102C. In some cases, a wireless network system or an individual wireless network device may support other types of wireless communication channels, or additional wireless communication channels of the same type (e.g., multiple distinct motion detection channels). In some cases, two or more adjacent wireless communication channels can be combined to form one motion detection channel, which may increase the frequency bandwidth of the motion detection channel.

In some implementations, the wireless communication channels 108 are frequency channels. For example, each of the wireless communication channels 108 may occupy or otherwise correspond to a distinct frequency bandwidth within a licensed or unlicensed band of wireless spectrum. The frequency channels may include overlapping bandwidths or non-overlapping bandwidths. In some Wi-Fi standards, each frequency channel corresponds to a distinct center frequency and has a frequency bandwidth. In an example, the center frequencies are separated by 5 MHz (e.g., 2.412 GHz, 2.417 GHz, 2.422 GHz, etc.) and each channel has a bandwidth of 20 MHz. The modem 112A of the wireless communication device 102A may be configured to communicate on other types of frequency channels, for example, that have other frequency spacings or frequency bandwidths.

In some implementations, the wireless communication channels 108 are coded channels. For example, each of the wireless communication channels may correspond to a distinct spreading code and operate within a common frequency range in a licensed or unlicensed band of wireless spectrum. In some cases, spreading codes are used to generate spread spectrum transmissions on each respective coded channel, for example, to avoid interference between coded channels in the same frequency range. In some types of code division multiple access (CDMA) standards, each coded channel corresponds to a distinct channel code that is combined with a data signal to generate the channel-coded signal. In an example, each channel code is a pseudorandom binary code. In some cases, multiple (e.g., some or all) of the coded channels share the same frequency bandwidth. The modem 112A of the wireless communication device 102A may be configured to communicate on other types of coded channels.

In some implementations, the wireless communication channels 108 include frequency channels and coded channels. For example, network traffic channels can be frequency channels, and motion detection channels can be coded channels. As another example, network traffic channels can be coded channels, and motion detection channels can be frequency channels.

As described below, one of the channels 108 may be selected based on signal quality metrics. The signal quality metric may attempt to quantify the ability for communications to be exchanged on a channel 108 between the wireless communication devices 102A, 102C. In some cases, the signal quality metric for each channel 108 may differ, since different channels 108 may have different interferers present. In some implementations, if a value of a signal quality metric for the wireless communication channel 108 currently being used does not meet a quality criterion for a motion detection process (e.g., the value of the signal quality metric is below a threshold), then a new channel 108 is selected. In some implementations, a channel is selected for communication based on the values of a signal quality metric for the respective channels 108. For example, the channel 108 with the highest signal quality metric value may be chosen for communication.

Figure 1C:
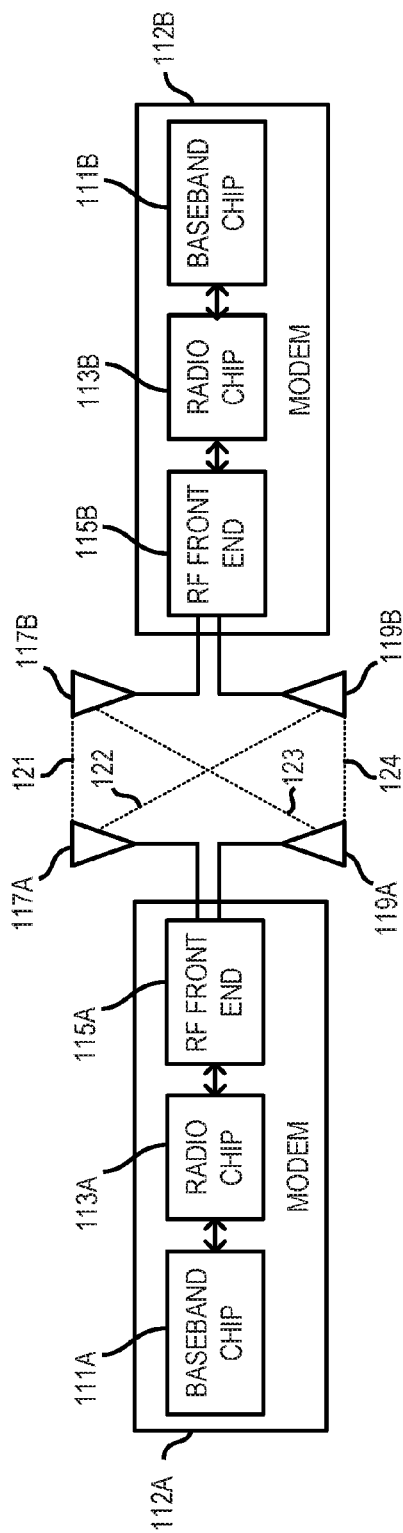
FIG. 1C is a diagram showing example wireless modems communicating over multiple communication paths.

FIG. 1C is a diagram showing example wireless modems 112A, 112B communicating over multiple communication paths 121-124. In some examples, each wireless modem 112 can be implemented as a card, a chip, a chipset, or another type of device. A modem may generally include a radio subsystem and a baseband subsystem, along with software or firmware for one or more wireless communication standards or other protocols. In some cases, a modem includes hardware, software, or firmware (or combinations thereof) to support multiple wireless communication standards (e.g., 3G and LTE). In some cases, the modems 112 can be implemented using commercial products or components, for example, a commercial Wi-Fi modem, a commercial cellular modem, a commercial Bluetooth modem, or commercially-available components thereof.

The example wireless modems 112 shown in FIG. 1C may be operated as described above. For example, the wireless modems 112 may transmit wireless signals on one or more wireless communication channels (e.g., network traffic channels and a dedicated motion detection channel), and may detect motion of object, for example, by processing received signals using modem parameters (e.g., settings related to the baseband chip 111, the radio chip 113, or the RF front end chip 115). In some instances, the example wireless modems 112 may operate in another manner.

The example wireless modems 112 communicate with each other over multiple communication paths 121-124. Each communication path is defined by a signal hardware path of the modem 112A and a signal hardware path of the modem 112B. For instance, in the example shown, the communication path 121 is defined by the antenna 117A of the modem 112A and the antenna 117B of the modem 117B, the communication path 122 is defined by the antenna 117A of the modem 112A and the antenna 119B of the modem 117B, the communication path 123 is defined by the antenna 119A of the modem 112A and the antenna 117B of the modem 117B, and the communication path 124 is defined by the antenna 119A of the modem 112A and the antenna 119B of the modem 117B. In some instances, the modems 112 may communicate over the various communication paths by transmitting signals from both antennas 117, 119 (e.g., the same signal at each antenna), and the signals may be received by the other modem using one or both of the antennas 117, 119 (e.g., depending on interference in the respective communication paths). In some implementations, the signal hardware paths include multiple antennas of the modems. For instance, a communication path may be defined by multiple antennas at a first modem and multiple antennas at a second modem.

The example wireless modems 112 shown in FIG. 1C include a baseband chip 111, a radio chip 113 and a radio frequency (RF) front end 115. The wireless modems 112 may include additional or different features, and the components may be arranged as shown or in another manner. In some implementations, the baseband chips 111 include the components and performs the operations of the baseband subsystem described with respect to the example modem 112 shown in FIG. 1A. In some implementations, the baseband chips 111 can process in-phase and quadrature signals (I and Q signals) from the radio chips 113 to extract data from received wireless signals. The baseband chips 111 may control the radio chips 113 or perform other operations. In some cases, the baseband chips 111 can be implemented as digital signal processors (DSP) or another type of data processing apparatus.

In some implementations, the radio chips 113 and the RF front ends 115 include the components and perform the operations of the radio subsystem described with respect to the example modem 112 shown in FIG. 1A. In some implementations, the radio chips 113 can produce in-phase and quadrature signals (I and Q signals), for example, in digital or analog format, based on received wireless signals. In some implementations, the RF front ends 115 can include one or more filters, RF switches, couplers, RF gain chips or other components that condition radio frequency signals for transmission or processing.

In some instances, the modems 112 process received signals that are based on motion probe signals transmitted through a space by the other modem. For example, the modem 112A can process received signals that are based on motion probe signals transmitted by the modem 112B. These received signals may be referred to as motion detection signals. Processing the received signals may include receiving the motion detection signals at one or both of the antennas 117, 119, conditioning (e.g., filtering, amplifying, or down-converting) the motion detection signals at the radio chip 113 or the RF front end 115, and digitally processing the motion detection signals at the baseband chip 111. The modem 112 may utilize one or more modem parameters that indicate one or more settings of the baseband chip 111, the radio chip 113, or the RF front end 115. For instance, the modem parameters may include one or more of a gain setting, an RF filter setting, an RF front end switch setting, a DC offset setting, an IQ compensation setting or another setting for the radio chip 113 or the RF front end 115, or a digital DC correction setting, a digital gain setting, a digital filtering setting or another setting for the baseband chip 111.

In the radio subsystem of the example modems 112 shown in FIG. 1C, the gain setting controls an amount of gain provided at the RF front ends 115 to an RF signal received by the antennas 117, 119 (e.g., using an automatic gain control (AGC) loop); the RF filter setting controls a bandwidth filter in the RF front ends 115 (e.g., based upon the expected bandwidth of the signal to be received at the antenna 117); the RF front end switch setting controls which RF filters or antenna switches are activated in the RF front ends 115 (e.g., to select a particular signal from one of many antennas); the DC offset setting controls an amount of DC signal correction applied in the radio chips 113 (e.g., using a DC offset loop) to a baseband signal; and the IQ compensation setting controls an amount of IQ phase correction applied to signals by the radio chips 113. In the baseband subsystem of the example modems 112 shown in FIG. 1C, the digital DC correction setting controls an amount of DC signal correction applied to a digital signal in the baseband chips 111; the digital gain setting controls an amount of gain applied to a digital signal in the baseband chips 111; and the digital filter setting controls which filter or filters are applied to a digital signal in the baseband chips 111.

In some examples, if a received signal has a relatively weak magnitude, the gain setting may increase an amount of gain applied to the received signal (before processing by the radio chip 113). Conversely, if a received signal has a relatively strong magnitude, the gain setting may decrease an amount of gain applied to the received signal. As another example, if an expected signal has a relatively wide bandwidth of approximately 40 MHz, the RF filter setting may set an RF filter in the RF front end 115 to allow a 40 MHz signal to pass from the antenna 117 to the radio chip 113. As another example, if there is an DC signal (a signal having ω=0 and positive or negative magnitude) present in a down-converted baseband signal, the DC offset setting may allow for a DC correction signal to be applied to the down-converted baseband signal in the radio chip 113 to remove the DC signal. As another example, where in-phase and quadrature signals (I and Q signals) do not have 90 degree phase difference (e.g., a 93 degree difference), an IQ correction signal may be applied to the signals to arrive at the desired 90 degree phase difference.

FIGS. 3A and 3B are diagrams showing example wireless signals communicated between wireless communication devices 304A, 304B, 304C. The wireless communication devices 304A, 304B, 304C can be, for example, the wireless communication devices 102A, 102B, 102C shown in FIG. 1A, or other types of wireless communication devices. The example wireless communication devices 304A, 304B, 304C transmit wireless signals through a space 300. The example space 300 can be completely or partially enclosed or open at one or more boundaries of the space 300. The space 300 can be or can include an interior of a room, multiple rooms, a building, an indoor area, outdoor area, or the like. A first wall 302A, a second wall 302B, and a third wall 302C at least partially enclose the space 300 in the example shown.

In the example shown in FIGS. 3A and 3B, the first wireless communication device 304A is operable to transmit wireless signals repeatedly (e.g., periodically, intermittently, at scheduled, unscheduled or random intervals, etc.). The transmitted signals may be formatted like the motion probe signal 202 of FIG. 2, or in another manner. The second and third wireless communication devices 304B, 304C are operable to receive signals based on those transmitted by the wireless communication device 304A. The wireless communication devices 304B, 304C each have a modem (e.g., the modem 112 shown in FIG. 1C) that is configured to process received signals to detect motion of an object in the space 300.

As shown, an object is in a first position 314A in FIG. 3A, and the object has moved to a second position 314B in FIG. 3B. In FIGS. 3A and 3B, the moving object in the space 300 is represented as a human, but the moving object can be another type of object. For example, the moving object can be an animal, an inorganic object (e.g., a system, device, apparatus, or assembly), an object that defines all or part of the boundary of the space 300 (e.g., a wall, door, window, etc.), or another type of object.

As shown in FIGS. 3A and 3B, multiple example paths of the wireless signals transmitted from the first wireless communication device 304A are illustrated by dashed lines. Along a first signal path 316, the wireless signal is transmitted from the first wireless communication device 304A and reflected off the first wall 302A toward the second wireless communication device 304B. Along a second signal path 318, the wireless signal is transmitted from the first wireless communication device 304A and reflected off the second wall 302B and the first wall 302A toward the third wireless communication device 304C. Along a third signal path 320, the wireless signal is transmitted from the first wireless communication device 304A and reflected off the second wall 302B toward the third wireless communication device 304C. Along a fourth signal path 322, the wireless signal is transmitted from the first wireless communication device 304A and reflected off the third wall 302C toward the second wireless communication device 304B.

In FIG. 3A, along a fifth signal path 324A, the wireless signal is transmitted from the first wireless communication device 304A and reflected off the object at the first position 314A toward the third wireless communication device 304C. Between FIGS. 3A and 3B, a surface of the object moves from the first position 314A to a second position 314B in the space 300 (e.g., some distance away from the first position 314A). In FIG. 3B, along a sixth signal path 324B, the wireless signal is transmitted from the first wireless communication device 304A and reflected off the object at the second position 314B toward the third wireless communication device 304C. The sixth signal path 324B depicted in FIG. 3B is longer than the fifth signal path 324A depicted in FIG. 3A due to the movement of the object from the first position 314A to the second position 314B. In some examples, a signal path can be added, removed, or otherwise modified due to movement of an object in a space.

The example wireless signals shown in FIGS. 3A and 3B may experience attenuation, frequency shifts, phase shifts, or other effects through their respective paths and may have portions that propagate in another direction, for example, through the walls 302A, 302B, and 302C. In some examples, the wireless signals are radio frequency (RF) signals. The wireless signals may include other types of signals.

In the example shown in FIGS. 3A and 3B, the first wireless communication device 304A can repeatedly transmit a wireless signal. In particular, FIG. 3A shows the wireless signal being transmitted from the first wireless communication device 304A at a first time, and FIG. 3B shows the same wireless signal being transmitted from the first wireless communication device 304A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless communication device 304A in an omnidirectional manner, in a directional manner or otherwise. In the example shown, the wireless signals traverse multiple respective paths in the space 300, and the signal along each path may become attenuated due to path losses, scattering, reflection, or the like and may have a phase or frequency offset.

As shown in FIGS. 3A and 3B, the signals from various paths 316, 318, 320, 322, 324A, and 324B combine at the third wireless communication device 304C and the second wireless communication device 304B to form received signals. Because of the effects of the multiple paths in the space 300 on the transmitted signal, the space 300 may be represented as a transfer function (e.g., a filter) in which the transmitted signal is input and the received signal is output. When an object moves in the space 300, the attenuation or phase offset affected upon a signal in a signal path can change, and hence, the transfer function of the space 300 can change. Assuming the same wireless signal is transmitted from the first wireless communication device 304A, if the transfer function of the space 300 changes, the output of that transfer function—the received signal—will also change. A change in the received signal can be used to detect movement of an object.

Mathematically, a transmitted signal f(t) transmitted from the first wireless communication device 304A may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 304A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \tag{3}$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \tag{4}$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n = \sum_k c_n \alpha_{n,k} e^{j\phi_{n,k}}. \tag{5}$$

The complex value $H_n$ for a given frequency component $\omega_n$ indicates a relative magnitude and phase offset of the received signal at that frequency component $\omega_n$. When an object moves in the space, the complex value $H_n$ changes due to the channel response $\alpha_{n,k}$ of the space changing. Accordingly, a change detected in the channel response can be indicative of movement of an object within the communication channel. In some instances, noise, interference, or other phenomena can influence the channel response detected by the receiver, and the motion detection system can reduce or isolate such influences to improve the accuracy and quality of motion detection capabilities. In some implementations, the overall channel response can be represented as:

$$h_{ch} = \sum_k \sum_{n=-\infty}^{\infty} \alpha_{n,k}. \tag{6}$$

In some instances, the channel response $h_{ch}$ for a space can be determined, for example, based on the mathematical theory of estimation. For instance, a reference signal $R_{ef}$ can be modified with candidate channel responses ($h_{ch}$), and then a maximum likelihood approach can be used to select the candidate channel which gives best match to the received signal ($R_{cvd}$). In some cases, an estimated received signal ($R_{cvd}$) is obtained from the convolution of the reference signal ($R_{ef}$) with the candidate channel responses ($h_{ch}$), and then the channel coefficients of the channel response ($h_{ch}$)

are varied to minimize the squared error of the estimated received signal ($\hat{R}_{cvd}$). This can be mathematically illustrated as:

$$\hat{R}_{cvd} = R_{ef} \otimes h_{ch} = \sum_{k=-m}^{m} R_{ef}(n-k)h_{ch}(k) \quad (7)$$

with the optimization criterion $$\min_{h_{ch}} \sum (\hat{R}_{cvd} - R_{cvd})^2. \quad (8)$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like.

As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

In some aspects, a signal quality metric may be determined for received signals based on the channel response. For example, a determined channel response ($h_{ch}$) for a space may be applied to a reference signal ($R_{ef}$) to yield an estimated received signal ($\hat{R}_{cvd}$), which is an estimation of what the received signal should be based on the channel response (e.g., based on convolution of the reference signal ($R_{ef}$) with the channel response ($h_{ch}$) as described above). The estimated received signal ($\hat{R}_{cvd}$) and the actual received signal ($R_{cvd}$) may be used to compute a signal quality metric. In some examples, for instance, the signal quality metric is based on (e.g., is set equal to, is computed from, is representative of, etc.) a value Q that is determined by computing the dot product of the actual received signal ($R_{cvd}$) and the difference between the estimated received signal ($\hat{R}_{cvd}$) and the actual received signal ($R_{cvd}$), e.g.:

$$Q = R_{cvd} \cdot (\hat{R}_{cvd} - R_{cvd}). \quad (9)$$

In some implementations, a number of viable communication paths between wireless communication devices can be determined. Each communication path can include a pair of antennas or other signaling hardware used to transmit and receive the wireless signals. For instance, a transmitting wireless communication device may have two transmitting antennas (e.g., T1 and T2) and a receiving wireless communication device may have two receiving antennas (e.g., R1 and R2). The wireless communication devices may accordingly communicate over up to four communication paths (e.g., T1→R1, T1→R2, T2→R1, and T2→R2). A communication path may be designated as a viable signal path based on a throughput for the communication path. For example, a reception rate score may be defined according to Equation (10):

$$RxRateScore = \max(0, MaxRxRate - PathRxRate) \quad (10)$$

where MaxRxRate is the minimum throughput needed for proper data transfer in the communication path, and PathRxRate is a measured throughput of the communication path. The measured throughput may be based on a number of packets received by the device on the communication path over a period of time. For example, in some instances, the throughput is measured as a number of total packets received on the path per second. As another example, the throughput is measured as a number of packets that are "accepted" (e.g., based on the signal quality metric values as described below) per second. If the PathRxRate is less than the MaxRxRate, then the path may be designated a viable communication path. In some instances, a viable path score may be determined according to Equation (11):

$$ViablePathScore = RxRateScore * Qweight \quad (11)$$

where Qweight is a weighting factor applied to the RxRateScore above based on the quality of communications on the path (e.g., using the value Q above in Equation (9)).

In some implementations, the signal quality metric is based on (e.g., is set equal to, is computed from, is representative of, etc.) a channel score value that is based on (e.g., is set equal to, is computed from, is representative of, etc.) the number of viable communication paths for the wireless communication channel. For example, each wireless communication channel may have a channel score value defined according to Equation (12):

$$ChannelScore = \sum_i a * ViablePathScore + b * ViablePath \quad (12)$$

where a and b are weighting factors applied to the ViablePathScore and ViablePath values for the i paths on the channel, where ViablePath is a Boolean value defined according to Equation (13):

$$ViablePath = RxRateScore > 0. \quad (13)$$

The signal quality metric may be determined using other calculations. In some cases, for example, the absolute value or magnitude of the dot product or another computed value is used as a signal quality metric for the received signal. In some cases, the signal quality metric is a correlation index, or another type of signal quality metric. In some cases, the signal quality metric is determined based on a signal-to-noise ratio (SNR) of the received signals.

In some cases, received signals may be "rejected" by a wireless communication device. For example, in some implementations, a motion detection process may include quality criterion for signals. Received signals that do not meet the quality criterion may be rejected (e.g., discarded or ignored) and not considered in determining whether motion has occurred in the space 300. The signals may be accepted or rejected as inputs to the motion detection process based on the signal quality metric (e.g., the value Q described by Equation (9)). For instance, in some cases, motion is detected using only a subset of received signals that have values Q above a certain threshold. In some implementations, the signal quality metric is based on a number of signals accepted as inputs to the motion detection process. For example, a computed signal quality metric may be weighted based on a percentage of signals that are accepted as inputs to the motion detection process over a period of time. Further, in some implementations, the signal quality metric is based on a period of time over which a minimum number of signals are accepted as inputs for the motion detection process. For example, a computed signal quality metric may be weighted according to how long it takes to obtain the minimum number of accepted signals (e.g., weighted down where it takes a longer time).

In some implementations, such as systems that have three or more wireless communication devices (e.g., the system of FIG. 1A or the system of FIGS. 3A-3B), the number of viable communication paths, the signal quality metric, or both can be considered in the selection of wireless communication channels used for motion detection. For instance, consider the example shown in Table 1, which shows signal quality metric information for links between a wireless communication device (Device 0) and two other wireless communication devices (i.e., Device 1 and Device 2):

TABLE 1

| Channel | Device 1 | Device 2 |
|---------|----------|----------|
| 1 | [7, 500] | [1, 100] |
| 2 | [4, 300] | [4, 300] |
| 3 | [1, 100] | [7, 500] | where, x in the [x, y] notation represents the number of viable communication paths for the channel, and y in the [x, y] notation represents the value of the signal quality metric for the channel (e.g., the channel score described in Equation (12) above). In the example shown in Table 1, the number of viable communication paths ranges from 0-8, and the value of the signal quality metric ranges from 0-600. Selecting channel 1 for communication between all devices in this example would provide relatively good communication quality between Device 0 and Device 1 (due to the high number of viable communication paths and high signal quality metric value), but relatively poor communication quality between Device 0 and Device 2 (due to the low number of viable communication paths and low signal quality metric value). Likewise, selecting channel 3 for communication between all devices in this example would provide relatively good communication quality between Device 0 and Device 2, but relatively poor communication quality between Device 0 and Device 1. Selecting channel 2 may provide adequate communication quality between the wireless communication devices due to the moderate number of viable communication paths and moderate signal quality metric values.

In some implementations, to enhance the quality of communication between wireless communication devices, the links between respective pairs of wireless communication devices can operate on different wireless communication channels. For instance, in the example shown in Table 1, Device 0 and Device 1 can communicate on channel 1 while Device 0 and Device 2 can communicate on channel 3. Because the wireless communication device may only be operable to communicate on one channel at a time, Device 0 (in this example) may be configured to switch its operation between the respective wireless communication channels to employ this technique.

In some implementations, a number of viable wireless communication devices can be determined for each wireless communication channel based on the signal quality metric values and the number of viable communication paths. The number of viable wireless communication devices may be determined based on a threshold value for the signal quality metric on each link between wireless communication devices. Referring to the example shown in Table 1, for example, channel 2 is determined to have two viable wireless communication devices based on each link between the wireless communication devices having a signal quality metric value that is greater than 250. Likewise, channels 1 and 3 in Table 1 are each determined to have one viable wireless communication device based on the same threshold of 250 for the signal quality metric value. In some implementations, the number of viable wireless communication devices for each channel is based on the channel having a minimum number or percentage of viable communication paths. For example, the number of viable wireless communication devices for a channel may be determined based on how many links between wireless communication devices have 50% or higher viable communication paths. In some implementations, the number of viable wireless communication devices for each channel is based on both a minimum number or percentage of viable communication paths and a minimum signal quality metric. For example, the number of viable wireless communication devices for a channel may be determined based on how many links between wireless communication devices have both (1) a signal quality metric value above a threshold value (e.g., 250 as in the example above), and (2) a number of viable communication paths above a threshold value (e.g., at least two viable communication paths). In some implementations, the wireless communication channel used for motion detection can be selected based on the number of viable devices. For example, the wireless communication channel with the highest number of viable devices may be chosen for use.

Figure 4:
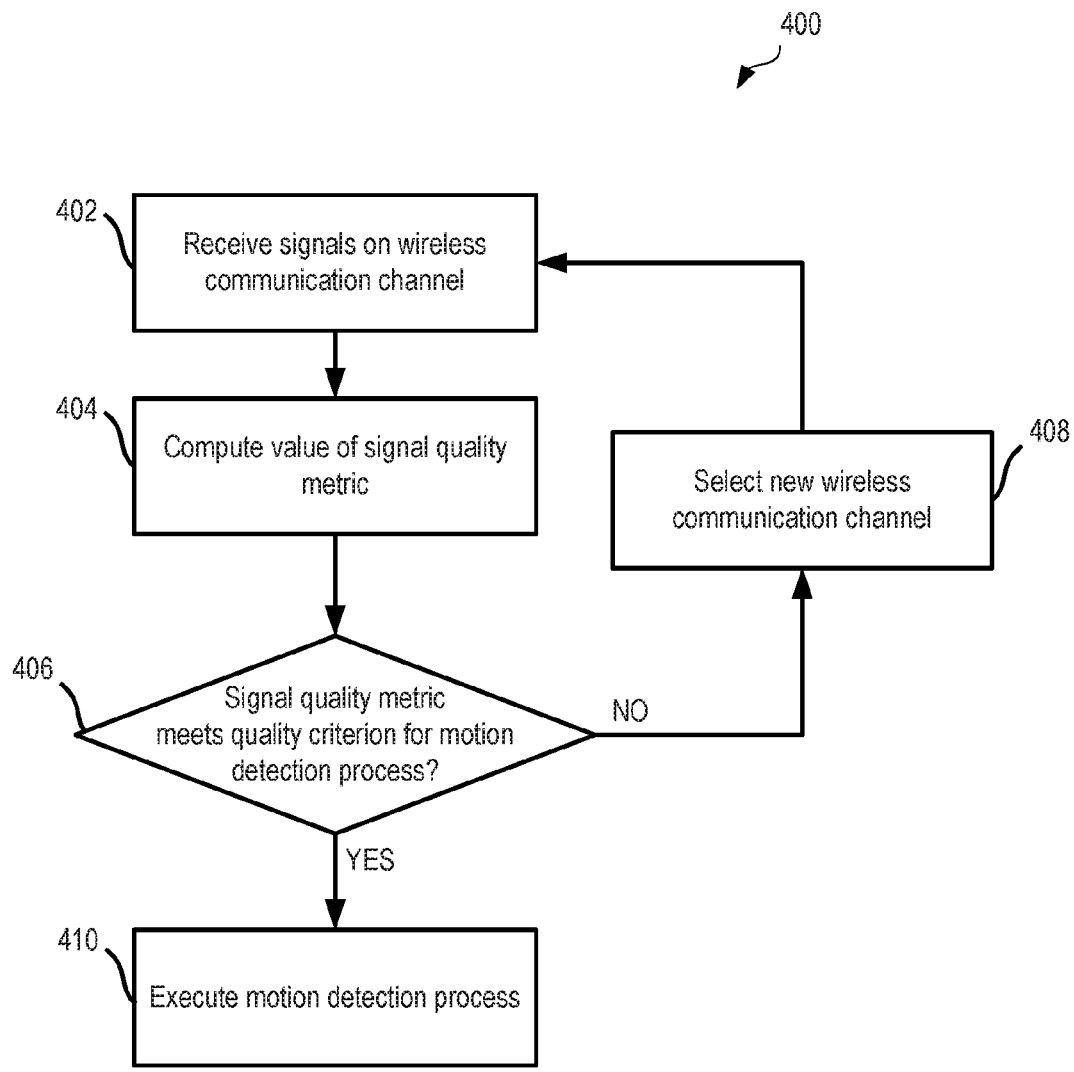
FIG. 4 is a flow diagram showing an example process of selecting a wireless communication channel based on signal quality metrics.

FIG. 4 is a flow diagram showing an example process 400 of selecting a wireless communication channel based on signal quality metrics. In some instances, the process 400 may be implemented to detect motion of an object in a space based on signals transmitted on a selected wireless communication channel. Operations in the example process 400 may be performed by a data processing apparatus (e.g., the processor 114 of the example wireless communication device 102C in FIG. 1A) to detect motion based on signals received at wireless communication devices (e.g., wireless communication device 102C of FIG. 1A). The example process 400 may be performed by another type of device. For instance, operations of the process 400 may be performed by a system other than the wireless communication device 102C that receives the signals (e.g., a computer system connected to the wireless communication system 100 of FIG. 1A that aggregates and analyzes signals received by the wireless communication device 102C).

The example process 400 may include additional or different operations, and the operations may be performed in the order shown or in another order. In some cases, one or more of the operations shown in FIG. 4 are implemented as processes that include multiple operations, sub-processes or other types of routines. In some cases, operations can be combined, performed in another order, performed in parallel, iterated, or otherwise repeated or performed another manner.

At 402, a first set of signals are received at a wireless communication device on a wireless communication channel. The wireless communication channel may be a frequency channel or a coded channel, and the signals may be based on wireless signals transmitted through a space by another (transmitting) wireless communication device. For example, referring to the example shown in FIG. 1A, the signals may be wireless signals transmitted by one (or both) of wireless communication devices 102A, 102B and received at the third wireless communication device 102C. In some implementations, the wireless communication device receiving the signals may be the same device that initially transmitted the wireless signal through the space. In some implementations, the received signals may be motion detection signals based on motion probe signals transmitted through a space. The motion detection signals may be received over a wireless communication channel used for network traffic, or a distinct wireless communication channel that is dedicated for motion detection.

At 404, a value of a signal quality metric is computed for the wireless communication channel. The signal quality metric value may be computed by the wireless communication device that received the signals at 402, or by another device (e.g., a server or other computing device communicatively coupled to the wireless communication device). The signal quality metric value for the channel may be computed based on (e.g., set equal to, computed from, representative of, etc.) a signal-to-noise ratio (SNR) for the signals received at 402. In some implementations, the signal quality metric value for the channel may be computed based on a comparison of the received signals and estimated received signals, where the estimated received signals are based on estimated channel responses of the space. For example, the signal quality metric value may be based on the value Q determined according to Equation (9) above (e.g., the signal quality metric value is set equal to the value Q). In some implementations, the signal quality metric value for the channel is computed based on a number of signals accepted or rejected by the wireless communication device (e.g., based on a quality criterion for a motion detection process). For example, a computed signal quality metric value may be weighted based on a percentage of signals that are accepted as inputs to the motion detection process over a period of time. In some implementations, the signal quality metric value for the channel is computed based on an amount of time over which a minimum number of signals are accepted as inputs to a motion detection process. For example, a computed signal quality metric value may be weighted according to how long it takes to obtain the minimum number of accepted signals (e.g., weighted down where it takes a longer time). In some instances, the signal quality metric value for the channel may be computed based on a number of viable communications paths between a transmitting wireless communication device and a receiving wireless communication device (e.g., between different pairs of antennas of the devices). For example, a computed signal quality metric value may be weighted down if it has a relatively low number of viable communication paths (e.g., less than 50% of the communication paths are deemed viable, as described above). In some instances, the signal quality metric value may be determined by weighting the signal quality metric value based on two or more of the above factors. In some implementations, the signal quality metric for the wireless communication channel is based on values of a signal quality metric determined for respective communication paths between the wireless communication devices. For example, the value of a signal quality metric for a channel may be an average (or weighted average) of signal quality metric values for each communication path on the channel.

At 406, it is determined whether the value of the signal quality metric meets a quality criterion of a motion detection process. In some cases, the quality criterion includes a threshold value for the signal quality metric. If the signal quality metric value does not meet the quality criterion, then the process proceeds to 408, where a new wireless communication channel is selected. The new wireless communication channel may be selected by the wireless communication device that received the motion detection signals at 402, or by another device (e.g., a server or other computing device communicatively coupled to the wireless communication device). In some implementations, the new wireless communication channel is selected randomly. In some implementations, the new channel is selected based on a comparison of signal quality metric values for the current wireless communication channel and the new wireless communication channel. In some instances, one or more aspects of the process 500 of FIG. 5 may be used in selecting the new wireless communication channel.

After the selection of the new wireless communication channel, the wireless communication device or devices transmitting or receiving the motion detection signals may be notified of the selected channel. For example, where a receiving device selects the channel, the transmitting wireless communication device may be notified by the receiving wireless communication device. For instance, the receiving wireless communication device may communicate the choice of the selected wireless communication channel by broadcasting a message on the network indicating the selected channel (e.g., a message indicating the selected channel in a header of a packet), or via a direct connection (e.g., a Wi-Fi Direct connection) with the transmitting wireless communication device. As another example, where another computing device communicatively coupled to the wireless communication devices selects the channel, both the transmitting and receiving devices may be notified of the selected channel by the device. For example, a remove server connected to the wireless communication devices (e.g., through the Internet) may notify both the wireless communication devices of the selected channel. Once the devices have been notified of the selected channel, they may begin transmitting motion probe signals on the selected channel and receiving signals based thereon.

If the signal quality metric does meet the quality criterion, then the process 400 proceeds to 410, where a motion detection process is executed. The motion detection process may detect motion of an object in the space based on the set of signals received at 402. In some instances, the motion detection process may include a comparison of signals received over a period of time. For example, motion may be detected based on a detected change in a frequency response of the signals received at 402, or based upon a detected change in the channel response for the space. In some implementations, in response to detecting motion, an action or programmed response may be taken. For example, a computing device (e.g., the wireless communication device 102C of FIG. 1A or another device) may activate a security alert (e.g., send an alert to security personnel, to a homeowners' mobile phone, or to another device), activate lighting or HVAC in the location where motion was detected (e.g., in a room, a hallway, or outdoors), or perform a combination of these or other types of programmed responses.

After the new channel is selected at 408 and a new set of signals is received on the selected channel, a signal quality metric value may be computed for the selected channel. and it may be determined whether the signal quality metric value meets the quality criterion for the motion detection process. If the signal quality metric does meet the quality criterion, then the motion detection process may be executed to detect motion based on the signals received on the selected channel. In some instances, the new channel may be selected preliminarily, and the new set of signals received on the new channel may be used to determine a signal quality metric value. The new channel may be selected for use in detecting motion if the new channel's signal quality metric value is greater than the signal quality metric value determined at 404.

In some implementations, to avoid, or to reduce the frequency of, oscillation between two wireless communication channels (e.g., two channels having similar signal quality metric values), the channel selection criteria may include one or more of the following: a difference between number of distinct communication paths or viable communication paths on the channels, a difference between the signal quality metric values for the channels, a difference between a number of wireless communication devices seen on the channels, or a combination thereof. For example, a channel change decision may be made if one or more of the following are satisfied: (1) the new channel can see one or more other wireless communication devices; (2) the number of communication paths on the current channel is below a threshold (e.g. 5 where there are 8 potential communication paths) and the new channel has one or more additional communication paths; (3) the number of communication paths on the current channel is above a threshold (e.g. 5 where there are 8 potential communication paths), the new channel has one or more additional paths, and the difference in signal quality metric values is greater than an appropriate negative threshold (e.g. −100); or (4) the number of communication paths on the current channel is above a threshold (e.g. 5 where there are 8 potential communication paths), the new channel has less than one fewer communication path, and the difference between the signal quality metric values is greater than an appropriate positive threshold (e.g. 100). For example, if a current channel has 6 communication paths and a signal quality metric value of 500, and a new channel has 7 paths and a signal quality metric value of 450, the system may select the new channel over the current channel. However, if the current channel has 5 communication paths and a signal quality metric value of 500, and the new channel has 7 communication paths and a signal quality metric value of 350, then the system may decide not to select the new channel since the difference in signal quality metric values is less than a threshold of −100. As another example, if a current channel has 5 communication paths and a signal quality metric value of 500, and a new channel has 4 communication paths and a signal quality metric value of 650, the system may decide to select the new channel. However, if the current channel has 7 paths and a signal quality metric value of 550, and the new channel has 6 communication paths and a signal quality metric value of 600, the system may decide to not select the new channel since the difference in the signal quality metric values is not above a threshold of 100.

In some implementations, channels may be checked periodically to determine whether a channel other than the one currently being used has a higher signal quality metric value. For example, sometime after a new wireless communication channel has been selected (assuming the signal quality metric values continue to meet the quality criterion of 406), other wireless communication channels may be checked to determine whether a signal quality metric value for those channels exceeds the value of the signal quality metric for the current wireless communication channel. In some instances, one or more aspects of the process 500 of FIG. 5 may be used in the periodic check.

Figure 5:
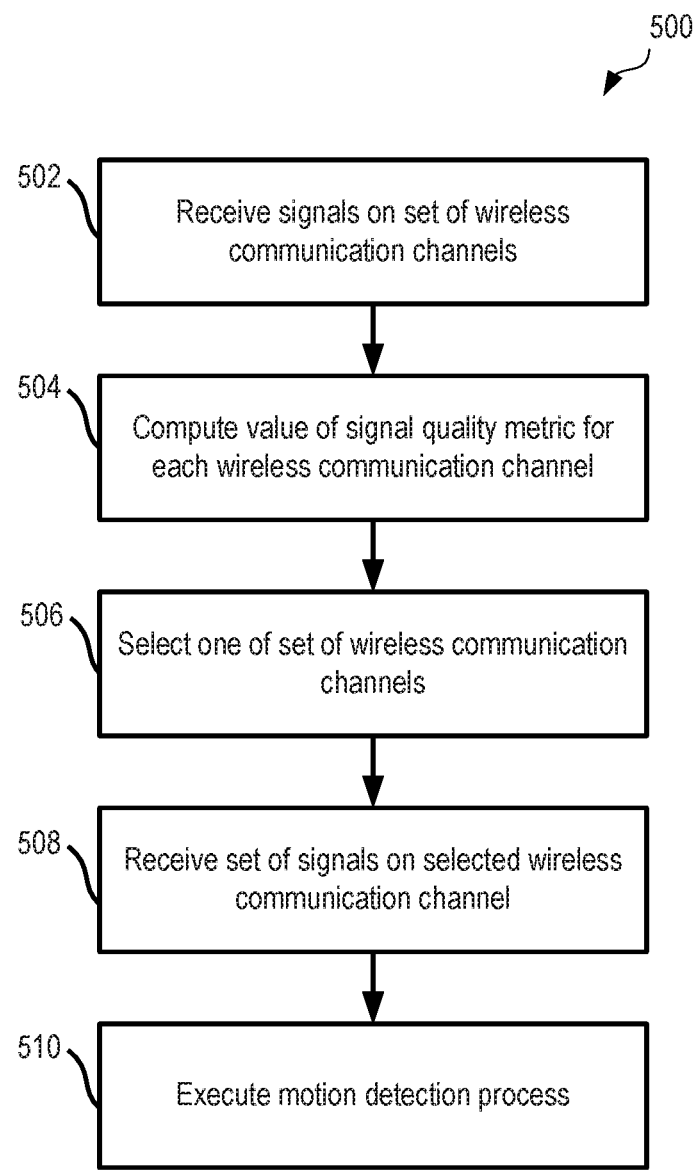
FIG. 5 is a flow diagram showing another example process of selecting a wireless communication channel based on signal quality metrics.

FIG. 5 is a flow diagram showing another example process 500 of selecting a wireless communication channel based on signal quality metrics. Operations in the example process 500 may be performed by a data processing apparatus of a wireless communication device (e.g., the processor 114 of the example third wireless communication device 102C in FIG. 1A) to detect motion based on motion detection signals received from other wireless communication devices (e.g., the wireless communication devices 102A, 102B of FIG. 1A). The example process 500 may be performed by another type of device. For instance, the example process 500 may be performed by a system other than the third wireless communication device 102C that is communicatively coupled to the third wireless communication device 102C (e.g., a computer system connected to the wireless communication system 100 of FIG. 1A that aggregates and analyzes motion detection signals received by the third wireless communication device 102C).

The example process 500 may include additional or different operations, and the operations may be performed in the order shown or in another order. In some cases, one or more of the operations shown in FIG. 5 are implemented as processes that include multiple operations, sub-processes or other types of routines. In some cases, operations can be combined, performed in another order, performed in parallel, iterated, or otherwise repeated or performed another manner.

At 502, a set of signals is received at a wireless communication device on a set of wireless communication channels. The wireless communication channels may be frequency channels or coded channels, and the signals may be based on wireless signals transmitted through a space by another (transmitting) wireless communication device. For example, referring to the example shown in FIG. 1A, the signals may be wireless signals transmitted by one (or both) of wireless communication devices 102A, 102B and received at the third wireless communication device 102C. In some implementations, the wireless communication device receiving the signals may be the same device that initially transmitted the wireless signal through the space. In some implementations, the received signals may be motion detection signals based on motion probe signals transmitted through a space. The motion detection signals may be received over a wireless communication channel used for network traffic, or a distinct wireless communication channel that is dedicated for motion detection.

In some implementations, the set of wireless communication channels is a subset of the available wireless communication channels. For instance, in a system using some example Wi-Fi protocols, there are up to 14 frequency channels available for communication, with some channels overlapping one another. The signals received at 502 may be sent on only a subset of those 14 channels. The channels may be selected due to their interaction (or lack thereof) with one another (e.g., channels 1, 6, and 11, since they do not overlap). In some implementations, the signals are received on each available wireless communication channel.

At 504, a value of a signal quality metric is computed for each wireless communication channel. The signal quality metric values may be computed as described above with respect to operation 404 of FIG. 4.

At 506, one of the wireless communication channels is selected from the set of wireless communication channels. The wireless communication channel may be selected by the wireless communication device that received the motion detection signals at 502, or by another device (e.g., a server or other computing device communicatively coupled to the wireless communication device). The wireless communication channel may be selected based on the signal quality metric values computed at 504, another factor, or a combination thereof. In some implementations, for example, a number of viable communication paths is determined for each wireless communication channel in the set, and the wireless communication channel is selected based on the signal quality metric value, the number of viable communication paths, or both. In some implementations, a communication path may be determined to be viable based on its throughput (e.g., its throughput is above a threshold value). The throughput may be determined as a number of total packets received by the device on the communication path over a period of time, or as a number of packets that are "accepted" (as inputs to the motion detection process) over the period of time. In some implementations, a number of viable wireless communication devices is determined based on the signal quality metric value and the number of viable communication paths, and the wireless communication channel is selected based on the number of viable communication devices for the channel.

In some implementations, to avoid, or to reduce the frequency of, oscillation between two wireless communication channels (e.g., two channels having similar signal quality metric values), the channel selection criteria may include one or more of the following: a difference between number of distinct communication paths or viable communication paths on the channels, a difference between the signal quality metric values for the channels, a difference between a number of wireless communication devices seen on the channels, or a combination thereof. For example, a channel change decision may be made if one or more of the following are satisfied: (1) the new channel can see one or more other wireless communication devices; (2) the number of communication paths on the current channel is below a threshold (e.g. 5 where there are 8 potential communication paths) and the new channel has one or more additional communication paths; (3) the number of communication paths on the current channel is above a threshold (e.g. 5 where there are 8 potential communication paths), the new channel has one or more additional paths, and the difference in signal quality metric values is greater than an appropriate negative threshold (e.g. −100); or (4) the number of communication paths on the current channel is above a threshold (e.g. 5 where there are 8 potential communication paths), the new channel has less than one fewer communication path, and the difference between the signal quality metric values is greater than an appropriate positive threshold (e.g. 100). For example, if a current channel has 6 communication paths and a signal quality metric value of 500, and a new channel has 7 paths and a signal quality metric value of 450, the system may select the new channel over the current channel. However, if the current channel has 5 communication paths and a signal quality metric value of 500, and the new channel has 7 communication paths and a signal quality metric value of 350, then the system may decide not to select the new channel since the difference in signal quality metric values is less than a threshold of −100. As another example, if a current channel has 5 communication paths and a signal quality metric value of 500, and a new channel has 4 communication paths and a signal quality metric value of 650, the system may decide to select the new channel. However, if the current channel has 7 paths and a signal quality metric value of 550, and the new channel has 6 communication paths and a signal quality metric value of 600, the system may decide to not select the new channel since the difference in the signal quality metric values is not above a threshold of 100.

After the selection of the new wireless communication channel, the wireless communication device or devices transmitting the motion detection signals may be notified of the selected channel. The transmitting wireless communication device may be notified directly by the receiving wireless communication device, or by another computing device communicatively coupled to the wireless communication devices. For example, the receiving wireless communication device may communicate the choice of the selected wireless communication channel by broadcasting a message on the network indicating the selected channel (e.g., a message indicating the selected channel in a header of a packet), or via a direct connection (e.g., a Wi-Fi Direct connection) with the transmitting wireless communication device. As another example, a remove server connected to the wireless communication devices (e.g., through the Internet) may be notified of the selected channel by the receiving wireless communication device, and may notify the transmitting device of the selected channel. Once the transmitting device has been notified of the selected channel, it may begin transmitting motion probe signals on the selected channel.

At 508, a new set of signals is received at the wireless communication devices on the wireless communication channel selected at 506. At 510, a motion detection process is executed. The motion detection process may detect motion of an object in the space based on the set of signals received at 508. In some instances, the motion detection process may include a comparison of signals received over a particular period of time. For example, motion may be detected based on a detected change in a frequency response of the signals received at 402, or based upon a detected change in the channel response for the space. In some implementations, in response to detecting motion, an action or programmed response may be taken. For example, a computing device (e.g., the wireless communication device 102C of FIG. 1A or another device) may activate a security alert (e.g., send an alert to security personnel, to a homeowners' mobile phone, or to another device), activate lighting or HVAC in the location where motion was detected (e.g., in a room, a hallway, or outdoors), or perform a combination of these or other types of programmed responses.

In some implementations, a new signal quality metric value may be determined for the wireless communication channel selected at 506, and the new signal quality metric may be based on the set of signals received at 508. Execution of the motion detection process at 510 may be based on whether the new signal quality metric value meets a quality criterion for the motion detection process (e.g., since the channel's quality may change after the selection is made at 506 and signals are received at 508).

In some implementations, the process 500 may be repeated periodically. For example, after a channel has been selected, it may be used for motion detection until an amount of time has passed. The amount of time may be determined based on a number of viable communication paths. For example, the amount of time may be determined according to the slow rate or fast rate as described in Table 2 below (which assumes 8 potential viable communication paths):

TABLE 2

| Number of viable communication paths | Slow Rate | Fast Rate |
| --- | --- | --- |
| 0 | Always | Always |
| 1 | 1 minute | 1 minute |
| 2 | 5 minutes | 1 minute |
| 3 | 12 minutes | 1.5 minutes |
| 4 | 15 minutes | 2 minutes |
| 5 | 30 minutes | 4 minutes |
| 6 | 30 minutes | 4 minutes |
| 7 | 30 minutes | 4 minutes |
| 8 | 30 minutes | 10 minutes |

If motion is detected by the motion detection process at 510, then the periodic check may be suspended until motion is no longer being detected.

In some implementations, after a channel has been selected (e.g., at 506 in process 500), the "freshness" of the collected signals (e.g., a measure of how often signals are being accepted) may be analyzed after a certain amount of time (e.g. 2 minutes). After the amount of time has passed, a fresh scan of the selected channel may be conducted and a new signal quality metric value may be computed (e.g., to ensure that the state of that channel is still valid). If the signal quality metric or the freshness meets some quality criterion, then the receiving wireless communication device may notify transmitting wireless communication devices that a channel change is imminent and a countdown timer may be started. At the point of expiration of the countdown timer, the channel selection process can repeat.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an internetwork (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of some of the examples described, a wireless communication channel is selected based on signal quality metrics.

In a first example, a first set of signals is received at a first wireless communication device. The first set of signals are based on wireless signals transmitted through a space on a first wireless communication channel from a second wireless communication device. A value of a signal quality metric is computed, by operation of one or more processors, based on the first set of signals. A second wireless communication channel is selected based on a determination that the value of the signal quality metric does not meet a quality criterion for a motion detection process. A second set of signals is received at the first wireless communication device. The second set of signals are based on wireless signals transmitted through the space on the second wireless communication channel from the second wireless communication device. A motion detection process is executed, by operation of one or more processors, to detect motion of an object in the space based on the second set of signals.

Implementations of the first example may, in some cases, include one or more of the following features. A message indicating the second wireless communication channel may be sent from the first wireless communication device to the second wireless communication device. The value of the signal quality metric may be based on a number of signals from the first set of signals that are rejected as inputs for the motion detection process based on the quality criterion for the motion detection process. The value of the signal quality metric may be based on a period of time over which a minimum number of the first set of signals are accepted as inputs for the motion detection process. The values of the signal quality metric may include a value of the signal quality metric for the first wireless communication channel, and the value of the signal quality metric for the first wireless communication channel may be based on values of the signal quality metric determined for respective communication paths between the first wireless communication device and the second wireless communication device. A difference in the number of communication paths on the first wireless communication channel and the number of communication paths on the second wireless communication channel may be computed, and the second wireless communication channel may be selected based on the difference. The value of the signal quality metric may be based on comparing the first set of signals and estimated received signals, and the estimated received signals may be based on estimated channel responses for the space. The first wireless communication channel and the second wireless communication channel may be frequency channels or coded channels. The quality criterion may include a threshold value for the signal quality metric.

Implementations of the first example may, in some cases, include one or more of the following features. The value of the signal quality metric may include a first value, a second value of the signal quality metric may be computed based on the second set of signals. The motion detection process may be executed based on a determination that the second value of the signal quality metric does meet the quality criterion. The value of the signal quality metric may include a first value. Selecting the second wireless communication channel may include computing a second value of a signal quality metric based on the second set of signals, and the second wireless communication channel may be selected based on a comparison of the first and second values.

In a second example, a first set of signals is received at a first wireless communication device. The first set of signals are based on wireless signals transmitted through a space on a set of wireless communication channels from a second wireless communication device. A value of a signal quality metric is computed, by operation of one or more processors, for each of the wireless communication channels based on the first set of signals. One of the set of wireless communication channels is selected based on a comparison of the values of the signal quality metric for the respective wireless communication channels. A second set of signals is received at the first wireless communication device. The second set of signals are based on wireless signals transmitted through the space on the selected wireless communication channel from the second wireless communication device. A motion detection process is executed, by operation of one or more processors, to detect motion of an object in the space based on the second set of signals.

Implementations of the second example may, in some cases, include one or more of the following features. A message indicating the selected wireless communication channel may be sent from the first wireless communication device to the second wireless communication device. The value of the signal quality metric may be based on a number of signals from the first set of signals that are rejected as inputs for the motion detection process based on a quality criterion for the motion detection process. The value of the signal quality metric may be based on a period of time over which a minimum number of the first set of signals are accepted as inputs for the motion detection process. The quality criterion may include a threshold value for the signal quality metric. The value of the signal quality metric may be based on values of the signal quality metric determined for respective communication paths between the first wireless communication device and the second wireless communication device, where each communication path includes a signal hardware path of the first wireless communication device and a signal hardware path of the second wireless communication device. The value of the signal quality metric may be based on comparing the first set of signals and estimated received signals, and the estimated received signals may be based on estimated channel responses for the space.

Implementations of the second example may, in some cases, include one or more of the following features. A number of viable communication paths for communication on each wireless communication channel between the first wireless communication device and the second wireless communication device may be determined, where each viable communication path includes a signal hardware path of the first wireless communication device and a signal hardware path of the second wireless communication device, and selecting one of the set of wireless communication channels may be based on at least one of the number of viable communication paths for the respective wireless communication channels and the values of the signal quality metric for the respective wireless communication channels. Determining the number of viable communication paths may be based on a throughput of each respective communication path. Determining the number of viable communication paths may include designating, as a viable communication path, each communication path having a throughput above a threshold value. A number of viable wireless communication devices may be determined for each wireless communication channel based on the value of the signal quality metric for the wireless communication channel and the number of viable communication paths for the wireless communication channel. The wireless communication channel may be selected based on the number of viable wireless communication devices.

In a third example, a number of viable communication paths for communication on the wireless communication channel between the first wireless communication device and each of second wireless communication devices is determined, and a value of a signal quality metric for communication on the wireless communication channel between the first wireless communication device and each of the second wireless communication devices is determined. The number of viable communication paths and the value of the signal quality metric are determined, by operation of one or more processors, for each wireless communication channel and are based on wireless signals received by a first wireless communication device over a set of wireless communication channels from a plurality of second wireless devices. One of the wireless communication channels is selected from the set for wireless motion detection based on at least one of the number of viable communication paths and the value of the signal quality metric for the wireless communication channel.

Implementations of the third example may, in some cases, include one or more of the following features. Determining the number of viable communication paths may be based on a throughput of each respective communication path. Determining the number of viable communication paths includes designating, as a viable communication path, each communication path having a throughput above a threshold value. A number of viable wireless communication devices may be determined for each wireless communication channel based on the value of the signal quality metric for the wireless communication channel and the number of viable communication paths for the wireless communication channel. The wireless communication channel may be selected based on the number of viable wireless communication devices.

In some implementations, a computer-readable medium stores instructions that are operable when executed by a data processing apparatus to perform one or more operations of the first, second, or third example. In some implementations, a system (e.g., a wireless communication device, computer system or other type of system communicatively coupled to the wireless communication device) includes a data processing apparatus and a computer-readable medium storing instructions that are operable when executed by the data processing apparatus to perform one or more operations of the first, second, or third example.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub combination.

A number of embodiments have been described. Nevertheless, it will be understood that various modifications can be made. Accordingly, other embodiments are within the scope of the following claims.

What is claimed is:

1. A motion detection method comprising:
receiving, at a first wireless communication device, a first set of signals based on wireless signals transmitted through a space on a first wireless communication channel from a second wireless communication device;
by operation of one or more processors, computing a value of a signal quality metric based on the first set of signals;
selecting a second wireless communication channel based on a determination that the value of the signal quality metric does not meet a quality criterion for a motion detection process;
receiving, at the first wireless communication device, a second set of signals based on wireless signals transmitted through the space on the second wireless communication channel from the second wireless communication device; and
by operation of one or more processors, executing the motion detection process to detect motion of an object in the space based on the second set of signals.

2. The method of claim 1, comprising sending, from the first wireless communication device to the second wireless communication device, a message indicating the second wireless communication channel.

3. The method of claim 1, comprising computing the value of the signal quality metric based on a number of signals from the first set of signals that are rejected as inputs for the motion detection process based on the quality criterion for the motion detection process.

4. The method of claim 3, comprising computing the value of the signal quality metric based on a period of time over which a minimum number of the first set of signals are accepted as inputs for the motion detection process.

5. The method of claim 1, wherein the value of the signal quality metric comprises a value of the signal quality metric for the first wireless communication channel, and the method comprises computing the value of the signal quality metric for the first wireless communication channel based on values of the signal quality metric determined for respective communication paths between the first wireless communication device and the second wireless communication device.

6. The method of claim 1, comprising computing a difference in the number of communication paths on the first wireless communication channel and the number of communication paths on the second wireless communication channel, wherein the second wireless communication channel is selected based on the difference.

7. The method of claim 1, comprising computing the value of the signal quality metric based on comparing the first set of signals and estimated received signals, wherein the estimated received signals are based on estimated channel responses for the space.

8. The method of claim 1, wherein the first wireless communication channel and the second wireless communication channel are frequency channels.

9. The method of claim 1, wherein the first wireless communication channel and the second wireless communication channel are coded channels.

10. The method of claim 1, wherein the quality criterion includes a threshold value for the signal quality metric.

11. The method of claim 1, wherein the value of the signal quality metric comprises a first value, and the method comprises computing a second value of the signal quality metric based on the second set of signals, wherein the motion detection process is executed based on a determination that the second value of the signal quality metric does meet the quality criterion.

12. The method of claim 1, wherein the value of the signal quality metric comprises a first value, and selecting the second wireless communication channel comprises:
   computing a second value of a signal quality metric based on the second set of signals; and
   selecting the second wireless communication channel based on a comparison of the first and second values.

13. A non-transitory computer-readable storage medium storing instructions that are operable when executed by a data processing apparatus to perform operations comprising:
   computing a value of a signal quality metric based on a first set of signals received at a first wireless communication device, the first set of signals based on wireless signals transmitted through a space on a first wireless communication channel from a second wireless communication device;
   selecting a second wireless communication channel based on a determination that the value of the signal quality metric does not meet a quality criterion for a motion detection process; and
   executing a motion detection process to detect motion of an object in the space based on a second set of signals received at the first wireless communication device, the second set of signals based on wireless signals transmitted through the space on the second wireless communication channel from the second wireless communication device.

14. The computer-readable storage medium of claim 13, the operations comprising sending, from the first wireless communication device to the second wireless communication device, a message indicating the second wireless communication channel.

15. The computer-readable storage medium of claim 13, wherein the value of the signal quality metric is computed based on a number of signals from the first set of signals that are rejected as inputs for the motion detection process based on the quality criterion for the motion detection process.

16. The computer-readable storage medium of claim 15, wherein the value of the signal quality metric is computed based on a period of time over which a minimum number of the first set of signals are accepted as inputs for the motion detection process.

17. The computer-readable storage medium of claim 13, wherein the value of the signal quality metric comprises a value of the signal quality metric for the first wireless communication channel, and the method comprises computing the value of the signal quality metric for the first wireless communication channel based on values of the signal quality metric determined for respective communication paths between the first wireless communication device and the second wireless communication device.

18. The computer-readable storage medium of claim 13, the operations comprising computing a difference in the number of communication paths on the first wireless communication channel and the number of communication paths on the second wireless communication channel, wherein the second wireless communication channel is selected based on the difference.

19. The computer-readable storage medium of claim 13, wherein the value of the signal quality metric is computed based on comparing the first set of signals and estimated received signals, and the estimated received signals are based on estimated channel responses for the space.

20. The computer-readable storage medium of claim 13, wherein the first wireless communication channel and the second wireless communication channel are frequency channels.

21. The computer-readable storage medium of claim 13, wherein the first wireless communication channel and the second wireless communication channel are coded channels.

22. The computer-readable storage medium of claim 13, wherein the quality criterion includes a threshold value for the signal quality metric.

23. The computer-readable storage medium of claim 13, wherein the value of the signal quality metric comprises a first value, and the operations comprise computing a second value of the signal quality metric based on the second set of signals, wherein the motion detection process is executed based on a determination that the second value of the signal quality metric does meet the quality criterion.

24. The computer-readable storage medium of claim 13, wherein the value of the signal quality metric comprises a first value, and selecting the second wireless communication channel comprises:
   computing a second value of a signal quality metric based on the second set of signals; and
   selecting the second wireless communication channel based on a comparison of the first and second values.

25. A motion detection system comprising:
   wireless communication devices distributed in a space, each wireless communication device comprising a modem configured to send and receive wireless signals through the space on any one of multiple wireless communication channels;
   a data processing apparatus communicably coupled to at least one of the wireless communication devices and configured to:
      compute a value of a signal quality metric based on a set of signals received at a first wireless communication device, the set of signals based on wireless signals transmitted on a first wireless communication channel from a second wireless communication device; and
      select a second wireless communication channel for communication between the first and second wireless communication devices based on a determination that the value of the signal quality metric does not meet a quality criterion for a motion detection process.

26. The system of claim 25, wherein the data processing apparatus is configured to send a message indicating the second wireless communication channel in response to selecting the second wireless communication channel.

27. The system of claim 25, wherein the data processing apparatus is configured to compute the value of the signal quality metric based on a number of signals from the first set of signals that are rejected as inputs for the motion detection process based on the quality criterion for the motion detection process.

28. The system of claim 25, wherein the value of the signal quality metric comprises a value of the signal quality metric for the first wireless communication channel, and the data processing apparatus is configured to compute the value of the signal quality metric for the first wireless communication channel based on values of the signal quality metric determined for respective communication paths between the first wireless communication device and the second wireless communication device.

29. The system of claim 25, wherein the data processing apparatus is configured to compute the value of the signal quality metric based on comparing the first set of signals and estimated received signals, the estimated received signals based on estimated channel responses for the space.

30. The system of claim 25, wherein the quality criterion includes a threshold value for the signal quality metric.

* * * * *